(12) United States Patent
Vukich et al.

(10) Patent No.: US 10,497,372 B1
(45) Date of Patent: Dec. 3, 2019

(54) VOICE-ASSISTANT ACTIVATED VIRTUAL CARD REPLACEMENT

(71) Applicant: Capital One Services, LLC, McLean, VA (US)

(72) Inventors: Adam Vukich, Alexandria, VA (US); Abdelkadar M'Hamed Benkreira, Washington, DC (US); Vu Nguyen, Pittsburg, CA (US); Joshua Edwards, Philadelphia, PA (US); Jonatan Yucra Rodriguez, San Francisco, CA (US); David Gabriele, New York, NY (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/515,869

(22) Filed: Jul. 18, 2019

(51) Int. Cl.
G10L 15/22 (2006.01)
G06F 3/16 (2006.01)
G06Q 20/34 (2012.01)

(52) U.S. Cl.
CPC ............. *G10L 15/22* (2013.01); *G06F 3/167* (2013.01); *G06Q 20/351* (2013.01); *G10L 2015/223* (2013.01)

(58) Field of Classification Search
CPC .. G06Q 20/351; G10L 15/22; G10L 2015/223
See application file for complete search history.

(56) References Cited

U.S. PATENT DOCUMENTS 8,577,803 B2 11/2013 Chatterjee et al.
9,842,330 B1* 12/2017 Van Os ................. G06Q 20/327
2003/0069874 A1* 4/2003 Hertzog ................ G06Q 10/109
2006/0059038 A1* 3/2006 Iuchi ...................... G06Q 20/06 705/14.28
2008/0308624 A1* 12/2008 Gardner ............... G06Q 20/227 235/380
2010/0185505 A1 7/2010 Sprogoe et al.
2011/0320310 A1* 12/2011 Brewer .................. G06O 20/40 705/26.35
2014/0162598 A1* 6/2014 Villa-Real ............... H04M 1/66 455/411
2014/0257961 A1* 9/2014 Zimmermann .... G06Q 30/0231 705/14.31
2015/0006391 A1* 1/2015 Agresta ................ G06Q 20/351 705/44

(Continued)

FOREIGN PATENT DOCUMENTS

WO 2012109628 A2 7/2012

OTHER PUBLICATIONS

Katherine Chavez, "Alexa, Update My Credit Card"—CardSavr™ API Leads Voice and Fintech Convergence, Jul. 25, 2018, 2 pages.

*Primary Examiner* — Eric Yen
(74) *Attorney, Agent, or Firm* — Harrity & Harrity, LLP

(57) ABSTRACT

A device may receive a command associated with identifying a merchant for a virtual card swap procedure wherein the virtual card swap procedure is to replace a credit card of a user with a virtual card corresponding to the credit card. The device may identify the merchant for the virtual card swap procedure based on the command. The device may obtain the virtual card for the user. The device may determine a virtual card swap procedure template for the merchant. The device may perform the virtual card swap procedure based on the virtual card swap procedure template.

20 Claims, 9 Drawing Sheets

(56) References Cited

U.S. PATENT DOCUMENTS

| | | | |
|---|---|---|---|
| 2015/0012426 A1* | 1/2015 | Purves | G06Q 30/0623 |
| | | | 705/41 |
| 2015/0073988 A1* | 3/2015 | Hosny | G06Q 20/10 |
| | | | 705/44 |
| 2015/0326623 A1* | 11/2015 | Albert | H04L 65/403 |
| | | | 715/753 |
| 2016/0275488 A1* | 9/2016 | Liu | G06Q 20/10 |
| 2017/0180286 A1* | 6/2017 | Yuan | H04W 88/02 |
| 2018/0285860 A1* | 10/2018 | Prabhu | G06Q 20/34 |

* cited by examiner

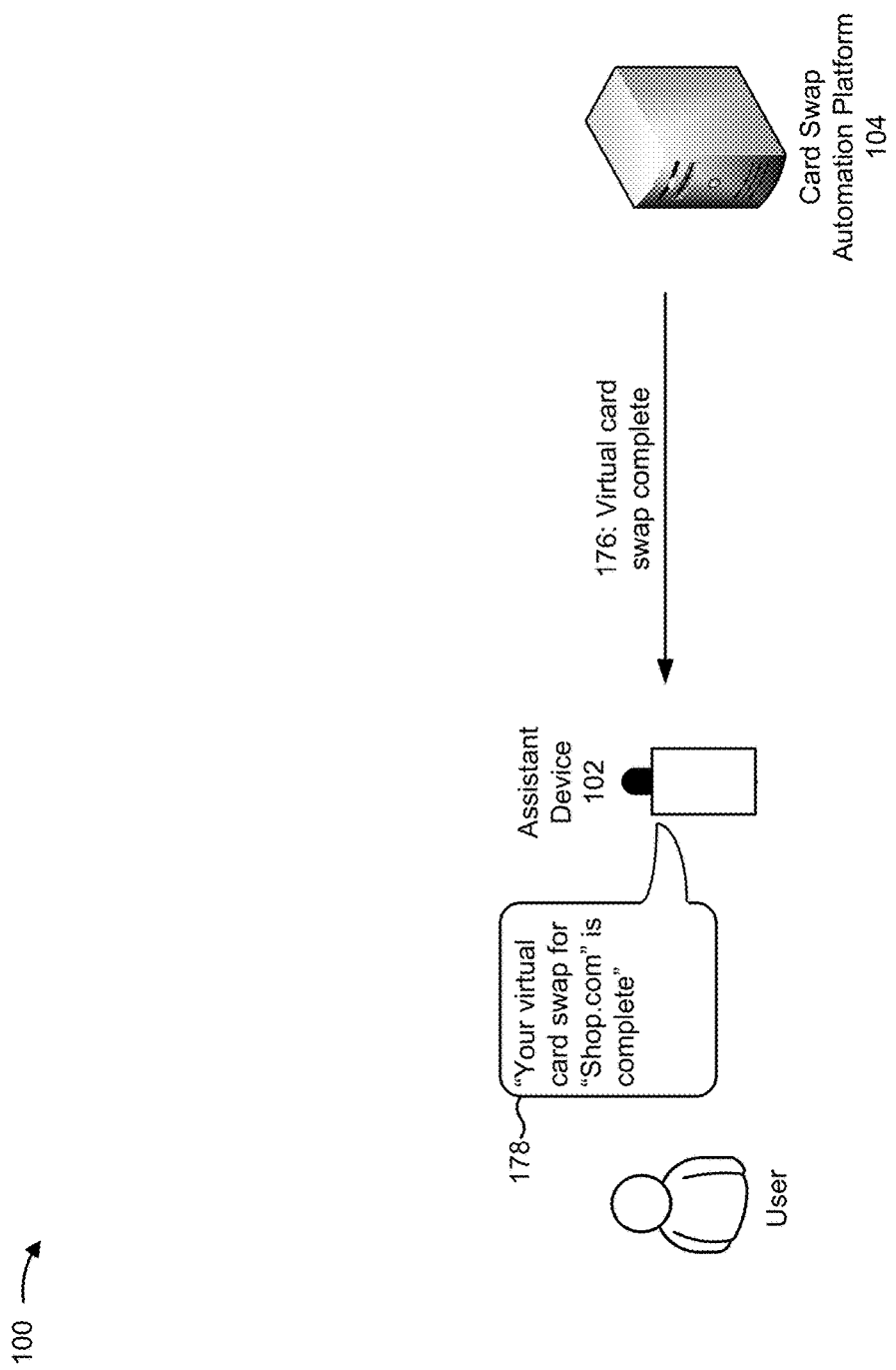

VOICE-ASSISTANT ACTIVATED VIRTUAL CARD REPLACEMENT

BACKGROUND

A virtual card is a computer-generated version of a credit card that may be linked to the credit card and used as a substitute for the credit card in transactions. For example, a bank may issue a transaction card (e.g., a credit card), and a transaction management system of the bank may also issue multiple virtual cards for use with merchant transaction systems of multiple individual merchants. In this case, the transaction management system may be configured such that a first virtual card is useable with only a first merchant, a second virtual card is useable with only a second merchant, and/or the like. Each virtual card may be linked to the credit card in the transaction management system to enable transactions using a particular virtual card to be charged to the credit card and a bank customer's corresponding bank account. In this way, the bank customer may transact using the virtual card.

If a security breach of a first merchant results in a first virtual card being exposed to, for example, a hacker, the hacker may only use the first virtual card at the first merchant and may not be able to use one or more second virtual cards at one or more second merchants. This may minimize a risk of the hacker using the virtual card, thereby improving information security, reducing monetary losses, and/or the like relative to use of a credit card. In such a case, the transaction management system may invalidate the first virtual card and may generate a new virtual card without affecting the credit card or other virtual cards linked thereto. This may minimize an inconvenience associated with issuing a new credit card and may reduce utilization of network resources associated with updating many different merchant systems with new credit card information.

SUMMARY

According to some implementations, a method may include receiving, by a device, a command associated with identifying a merchant for a virtual card swap procedure, wherein the virtual card swap procedure is to replace a credit card of a user with a virtual card corresponding to the credit card; identifying, by the device, the merchant for the virtual card swap procedure based on the command; obtaining, by the device, the virtual card for the user; determining, by the device, a virtual card swap procedure template for the merchant; and performing, by the device, the virtual card swap procedure based on the virtual card swap procedure template, wherein performing the virtual card swap procedure comprises: determining, by the device, user information for the user; accessing, by the device and using the user information, transaction information for the user in a merchant transaction system of the merchant; swapping, by the device, credit card information relating to the credit card with virtual card information relating to the virtual card in the merchant transaction system; and causing, by the device, the virtual card information to be stored in the merchant transaction system for subsequent use by the user.

According to some implementations, a device may include one or more memories, and one or more processors, communicatively coupled to the one or more memories, configured to: receive, from a voice assistant, a voice command associated with identifying a merchant for a virtual card swap procedure for a credit card of a user; process the voice command to determine a content of the voice command; obtain, for the user and based on the content of the voice command, a virtual card corresponding to the credit card; determine user information relating to an account of the user with the merchant; access, using the user information, a merchant transaction system; store, in the merchant transaction system, information identifying the virtual card; and provide, for output via the voice assistant, information confirming success of the virtual card swap procedure.

According to some implementations, a non-transitory computer-readable medium may store one or more instructions. The one or more instructions, when executed by one or more processors of a device, may cause the one or more processors to: receive, from a voice assistant, a command associated with identifying a merchant for a virtual card swap procedure; identify the merchant for the virtual card swap procedure based on the command; obtain, based on identifying the merchant, user information for accessing a merchant transaction system; obtain a virtual card corresponding to a credit card of a user based on the user information; accessing, in accordance with a virtual card swap procedure template for the merchant transaction system, the merchant transaction system using the user information; swapping, in accordance with the virtual card swap procedure template and based on accessing the merchant transaction system, credit card information relating to the credit card with virtual card information relating to the virtual card in the merchant transaction system; and provide, to the voice assistant, a confirmation indicating that the virtual card is stored in the merchant transaction system.

BRIEF DESCRIPTION OF THE DRAWINGS

FIGS. 1A-1D are diagrams of an example implementation described herein.

DETAILED DESCRIPTION

The following detailed description of example implementations refers to the accompanying drawings. The same reference numbers in different drawings may identify the same or similar elements.

When a new virtual card is created (e.g., to replace use of a credit card, to replace use of a previous virtual card, and/or the like), a user device may access a merchant transaction system to update the virtual card in the merchant transaction system. For example, a user may use a web browser to navigate to a webpage of the merchant transaction system, provide security credentials, and provide information identifying a new virtual card for storage in the merchant transaction system. Such a task may be difficult for an automated computing system, as each merchant transaction system may be associated with a different sequence of webpages, require different security credentials, use two-factor authentication, and/or the like. However, failure to use virtual cards may result in poor information security for the user, which may increase a likelihood of identity theft, fraudulent transactions, and/or the like relative to use of credit cards.

As a result, ever stronger fraud-detection algorithms may need to be developed, which may use excess computing resources to analyze transactions and predict whether the transactions are genuine. Moreover, failure to update an existing virtual card in a merchant transaction system may result in a failure to successfully complete transactions. For example, when a user attempts to complete a merchant transaction using an out-of-date virtual card stored in the merchant transaction system, the merchant transaction system may flag an error, may incorrectly record the transaction, and/or the like.

Some implementations described herein may use virtual-assistant activated automated virtual card swapping to enable replacement of a credit card with a virtual card in a merchant transaction system and/or to update an existing virtual card in the merchant transaction system. By enabling automatic card swapping and/or batch process automatic card swapping, a quantity of credit cards used for merchant transactions may be reduced, and a quantity of virtual cards used for merchant transactions may be increased. In this way, a necessity of complex, computing resource intensive fraud detection algorithms is reduced, thereby reducing an overall utilization of processing resources. Further, a likelihood of an out-of-date virtual card being inadvertently used for a transaction is reduced, thereby reducing a likelihood of system errors relating to use of the out-of-date virtual card.

Figure 1A:
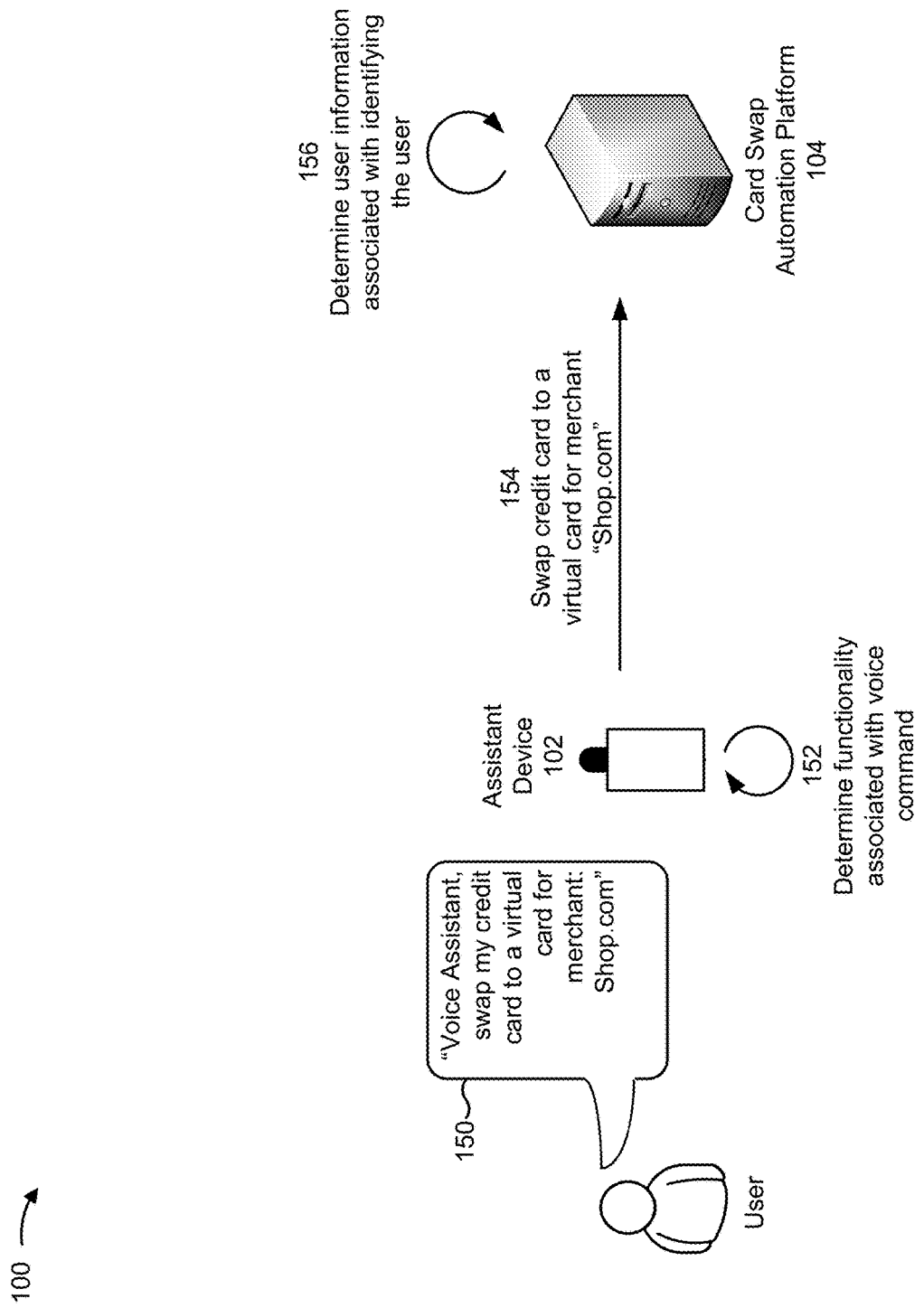

FIGS. 1A-1D are diagrams of an example implementation 100 described herein. As shown in FIG. 1A, example implementation 100 includes an assistant device 102 and a card swap automation platform 104.

As further shown in FIG. 1A, and by reference number 150, assistant device 102 (e.g., in connection with processing performed by and/or instructions received from card swap automation platform 104) may detect a voice command from a user. For example, assistant device 102 may monitor for user speech, and may detect a voice command indicating that assistant device 102 is to perform a virtual card swap procedure. Additionally, or alternatively, assistant device 102 may monitor for another type of command, such as a gesture command. Additionally, or alternatively, assistant device 102 may monitor for a configured symbolic command. For example, assistant device 102 may detect (e.g., using a camera) that the user is holding a credit card in front of assistant device 102, and may be triggered to perform a virtual card swap procedure for the credit card.

In some implementations, assistant device 102 may receive contextual information associated with the virtual card swap procedure when detecting a command. For example, assistant device 102 may detect a target for the card swap procedure, based on determining that a user identified a particular webpage in the command. In some implementations, assistant device 102 may authenticate a user to perform the virtual card swap procedure. For example, before triggering the virtual card swap procedure, assistant device 102 may request that the user provide a user name, a password, a pass phrase, and/or the like associated with the virtual card swap procedure. Additionally, or alternatively, assistant device 102 may request that the user provide security information regarding a credit card for which the virtual card swap procedure is to be performed (e.g., a personal identification number (PIN number), a security code, an expiration date, and/or the like). Additionally, or alternatively, assistant device 102 may automatically authenticate the user. For example, assistant device 102 may perform voice print identification using the voice command or a pass phrase, may perform facial recognition using a camera of assistant device 102, and/or the like.

As further shown in FIG. 1A, and by reference number 152, assistant device 102 (e.g., in connection with processing performed by and/or instructions received from card swap automation platform 104) may determine a functionality associated with the voice command. For example, assistant device 102 may determine that the voice command is associated with indicating that assistant device 102 is to perform the virtual card swap procedure based on matching the voice command against a pre-configured set of voice commands. Additionally, or alternatively, assistant device 102 may use a speech-to-text functionality and/or a natural language processing functionality to parse the voice command to determine that a semantic meaning of the voice command indicates that assistant device 102 is to perform the virtual card swap procedure.

As further shown in FIG. 1A, and by reference number 154, assistant device 102 may provide an indication to card swap automation platform 104, indicating that card swap automation platform 104 is to perform the virtual card swap procedure for a particular merchant transaction system. For example, card swap automation platform 104 may receive an indication that assistant device 102 detected a command associated with identifying a merchant for a virtual card swap procedure, and may initiate the virtual card swap procedure to replace a credit card of a user with a virtual card corresponding to the credit card. Additionally, or alternatively, card swap automation platform 104 may initiate the virtual card swap procedure to replace a previous or existing virtual card with a new virtual card.

In some implementations, card swap automation platform 104 may receive an indication of a batch process for performing multiple virtual card swap procedures. For example, based on assistant device 102 detecting a command identifying multiple merchants, card swap automation platform 104 may perform multiple virtual card swap procedures. In this case, card swap automation platform 104 may store common user information for the multiple virtual card swap procedures (e.g., a common user name), thereby reducing an amount of network traffic relative to receiving multiple commands for virtual card swap procedures, requesting the same user name multiple times for the multiple virtual card swap procedures, and/or the like. In some implementations, card swap automation platform 104 may use a common virtual card for multiple virtual card swap procedures in a batch process, multiple different virtual cards for the multiple card swap procedures in the batch process, and/or the like.

In some implementations, card swap automation platform 104 may determine a virtual card swap procedure template for the virtual card swap procedure and based on receiving the indication of the command. For example, card swap automation platform 104 may identify the merchant, and may obtain a stored virtual card swap procedure template relating to a merchant transaction system of the merchant. In this case, the virtual card swap procedure template may include information identifying user information required for access to the merchant transaction system (e.g., a user name, a user password, a knowledge-based question, a two-factor authentication based response, etc.).

Additionally, or alternatively, the virtual card swap procedure template may include information identifying a format for an interface provided by the merchant transaction system. For example, the virtual card swap template may include information indicating that a first text box at a first position in a webpage is to receive a user name, a second text box at a second position in a webpage is to receive a password, and/or the like. Additionally, or alternatively, the virtual card swap procedure template may include information indicating one or more authentication procedures for accessing the merchant transaction system, such as a two-factor authentication procedure, a knowledge-based question procedure, and/or the like.

In some implementations, card swap automation platform 104 may automatically generate a virtual card swap procedure template. For example, card swap automation platform 104 may access a webpage of a merchant, parse information on the webpage to detect elements of the webpage (e.g., a text entry element to receive user information, a button element to receive a submission of the user information, etc.), and may generate the virtual card swap procedure template based on parsing the webpage. In this case, card swap automation platform 104 may store information identifying the virtual card swap procedure template for subsequent use, thereby reducing processing relative to ad hoc determination of the virtual card swap procedure template each time the virtual card swap procedure is to be performed. In some implementations, card swap automation platform 104 may schedule a merchant for generation of a virtual card swap procedure template. For example, based on not detecting a stored virtual card swap procedure template, card swap automation platform 104 may generate a ticket indicating that a developer is to manually create a virtual card swap procedure template for subsequent use. In this case, card swap automation platform 104 may create a calendar appointment for a particular developer to create the virtual card swap procedure (e.g., based on a single request for a virtual card swap procedure with a merchant, based on a threshold quantity of requests associated with the merchant, and/or the like). Further, after the virtual card swap procedure template is created, card swap automation platform 104 may be triggered to use the virtual card swap procedure template to complete a virtual card swap procedure.

As further shown in FIG. 1A, and by reference number 156, card swap automation platform 104 may determine user information associated with identifying the user. For example, card swap automation platform 104 may request follow-up user information based on determining the virtual card swap procedure template. In this case, card swap automation platform 104 (e.g., using assistant device 102) may request and receive a user name, a password, a response to a knowledge based question, and/or the like based on the virtual card swap procedure template indicating that the follow-up user information will be necessary to access a merchant transaction system. Additionally, or alternatively, card swap automation platform 104 may access a stored user profile (e.g., generated based on user input, generated based on previous virtual card swap procedures performed for the user, and/or the like) to obtain follow-up user information.

Figure 1B:
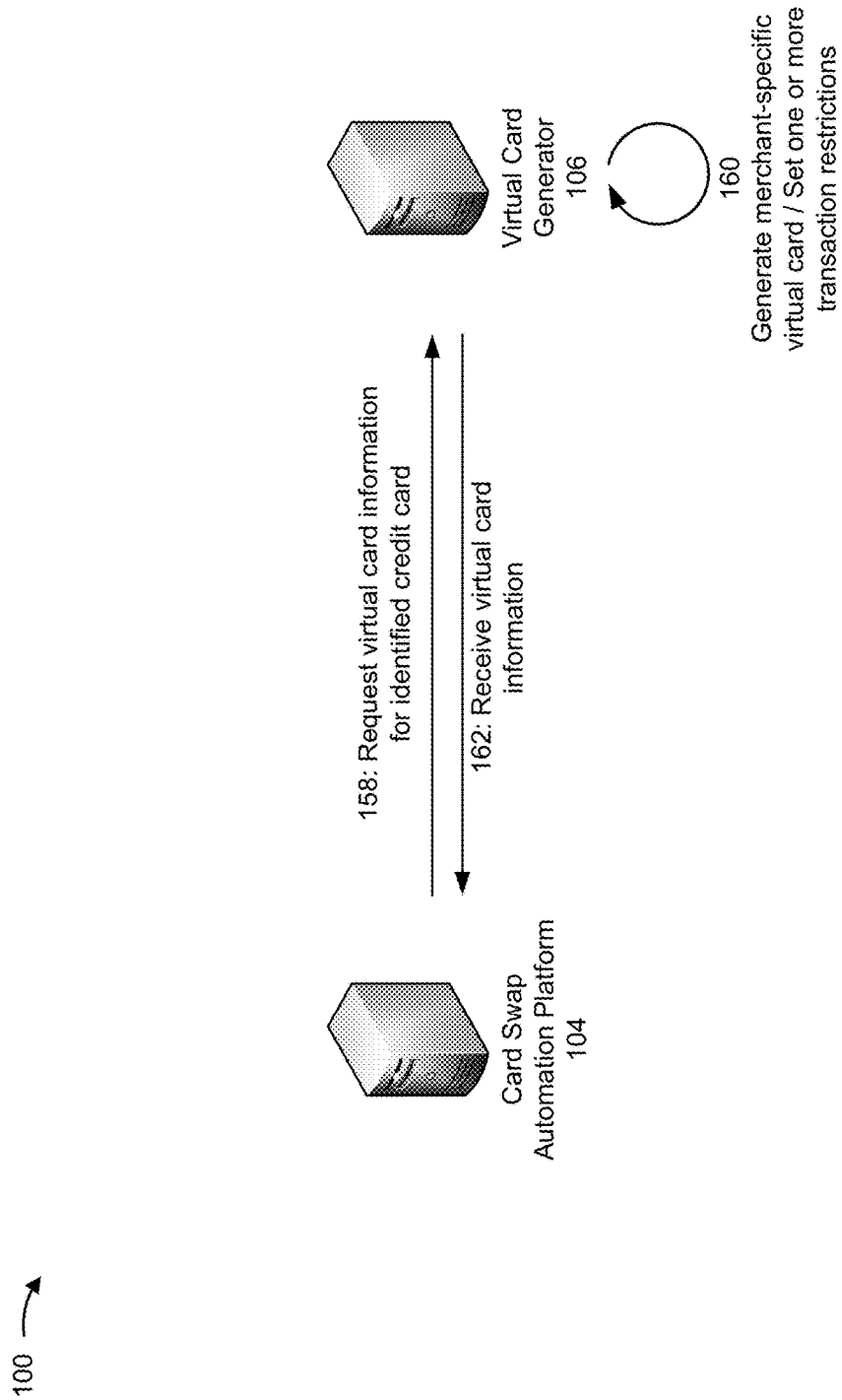

As shown in FIG. 1B, and by reference number 158, card swap automation platform 104 may request virtual card information for an identified credit card. For example, card swap automation platform 104 may request that virtual card generator 106 generate a virtual card to replace a credit card of the user for the selected merchant transaction system. In some implementations, card swap automation platform 104 may request a particular format of virtual card from virtual card generator 106. For example, card swap automation platform 104 may request a numeric virtual card, an alphabetic virtual card, an alphanumeric virtual card, a symbolic virtual card (e.g., that uses a quick response (QR) code), and/or the like.

As further shown in FIG. 1B, and by reference numbers 160 and 162, virtual card generator 106 may generate a merchant-specific virtual card, and may provide virtual card information identifying the merchant-specific virtual card to card swap automation platform 104. For example, card swap automation platform 104 may receive a virtual card number, a virtual card expiration date, a virtual card PIN number, and/or the like.

In some implementations, virtual card generator 106 (or card swap automation platform 104) may set one or more transaction restrictions for the virtual card. For example, virtual card generator 106 (or card swap automation platform 104) may configure a transaction processing system (e.g., of card swap automation platform 104, separate from card swap automation platform 104, and/or the like) such that the virtual card is only usable for the selected merchant transaction system. Additionally, or alternatively, virtual card generator 106 (or card swap automation platform 104) may set another type of transaction restriction on the virtual card. For example, virtual card generator 106 (or card swap automation platform 104) may configure a transaction processing system to permit the virtual card to be used at a particular range of times of day, for a transaction of less than a threshold value, and/or the like.

Figure 1C:
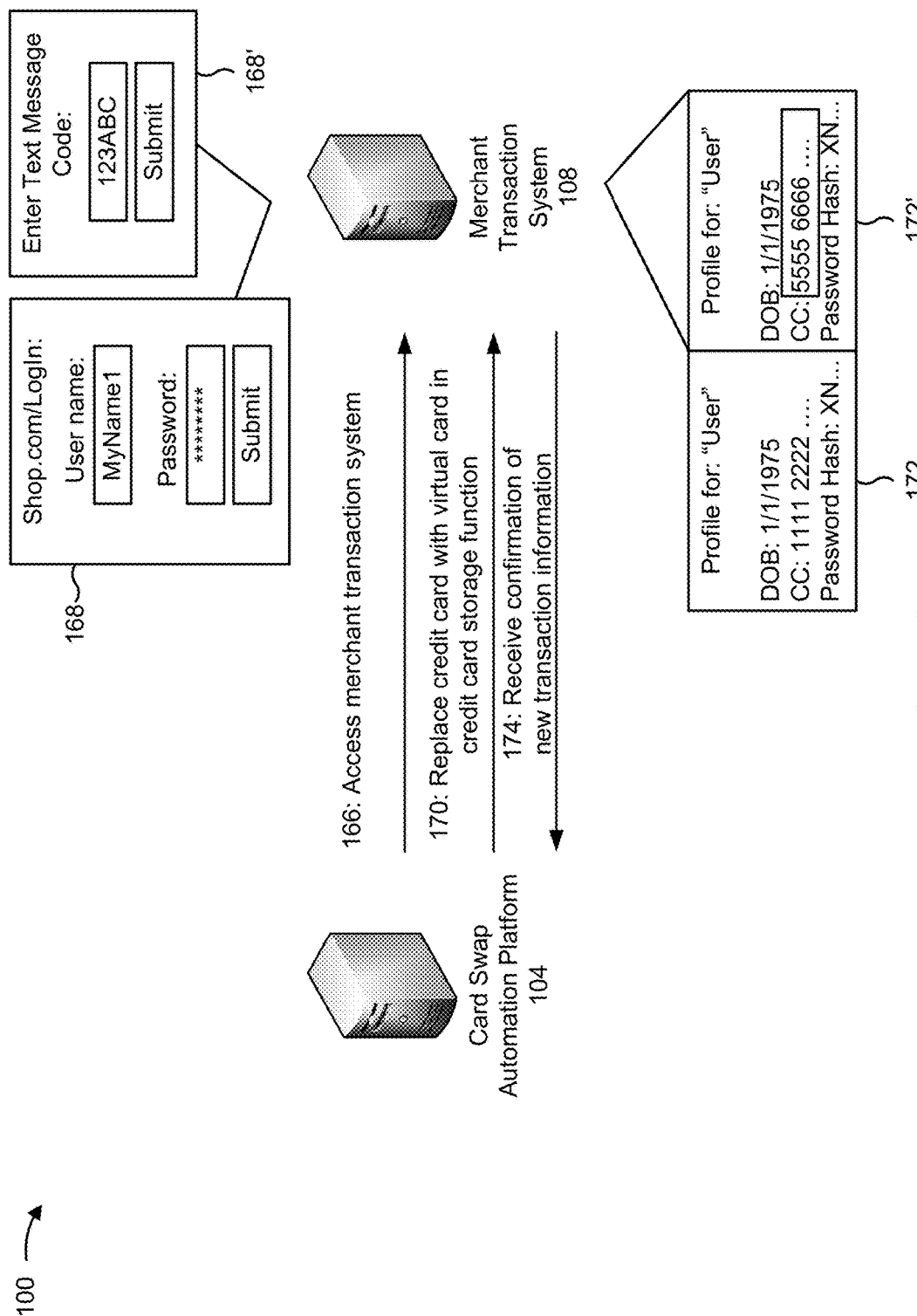

As shown in FIG. 1C, and by reference number 166, card swap automation platform 104 may access merchant transaction system 108. For example, as shown by reference number 168, in accordance with the virtual card swap procedure template for the merchant, card swap automation platform 104 may input a user name ("MyName1") and password ("*********") into a set of text entry boxes of a webpage ("Shop.com/LogIn") provided by merchant transaction system 108 to obtain access to a user profile. In this case, card swap automation platform 104 may determine user information, of available user information for a user, that is to be provided to merchant transaction system 108, and may obtain access to the user profile in which transaction information for the user is stored.

In some implementations, card swap automation platform 104 may complete a multi-part authentication procedure to access merchant transaction system 108. For example, card swap automation platform 104 may provide first user information, which may trigger a two-factor authentication procedure. In this case, based on the card swap automation procedure template, card swap automation platform 104 may (e.g., using assistant device 102) request the user to provide a result of the two-factor authentication procedure, and may provide the result of the two-factor authentication procedure as second user information to merchant transaction system 108, as shown by reference number 168'.

Similarly, card swap automation platform 104 may provide first user information, which may trigger a knowledge based question procedure. In this case, card swap automation platform 104 may parse a webpage to determine the knowledge based question, may query the user for an answer (e.g., using assistant device 102) or identify a stored answer, and may provide the answer as second user information to merchant transaction system 108. In some implementations, card swap automation platform 104 may communicate with another device to complete a multi-part authentication procedure. For example, card swap automation platform 104 may communicate with a user device of the user (e.g., via assistant device 102) to obtain a result of a two-factor authentication procedure, to detect the user device within a proximity of assistant device 102 as a second factor of a two-factor authentication procedure, and/or the like.

As further shown in FIG. 1C, and by reference number 170, card swap automation platform 104 may replace credit card information with virtual card information in a credit card storage function of merchant transaction system 108. For example, card swap automation platform 104 may swap credit card information in user profile 172 with generated virtual card information (e.g., a virtual card number, a virtual card expiration date, a virtual card PIN number, and/or the like) to generate user profile 172'. In this case, card swap automation platform 104 may, in accordance with the virtual card swap procedure template (e.g., identifying a button for saving user profile 172'), cause user profile 172' to be stored in merchant transaction system 108 for subsequent use by the user.

As further shown in FIG. 1C, and by reference number 174, card swap automation platform 104 may receive confirmation that new transaction information (e.g., the virtual card information) is saved in user profile 172 on merchant transaction system 108. In some implementations, card swap automation platform 104 may automatically complete a transaction using the virtual card based on swapping the virtual card in merchant transaction system 108. For example, when card swap automation platform 104 triggers the virtual card swap procedure based on a command to perform a transaction received by assistant device 102, card swap automation platform 104 may perform the virtual card swap procedure and the requested transaction.

As shown in FIG. 1D, and by reference numbers 176 and 178, based on receiving the confirmation that new transaction information (e.g., the virtual card) is saved in merchant transaction system 108, card swap automation platform 104 may provide (e.g., using assistant device 102) confirmation to a user that the virtual card swap procedure is complete. In this way, card swap automation platform 104 automates, in connection with an assistant device 102, a procedure for performing a virtual card swap, thereby increasing information security, reducing a difficulty in performing a virtual card swap, and/or the like.

As indicated above, FIGS. 1A-1D are provided merely as an example. Other examples may differ from what was described with regard to FIGS. 1A-1D.

Figure 2:
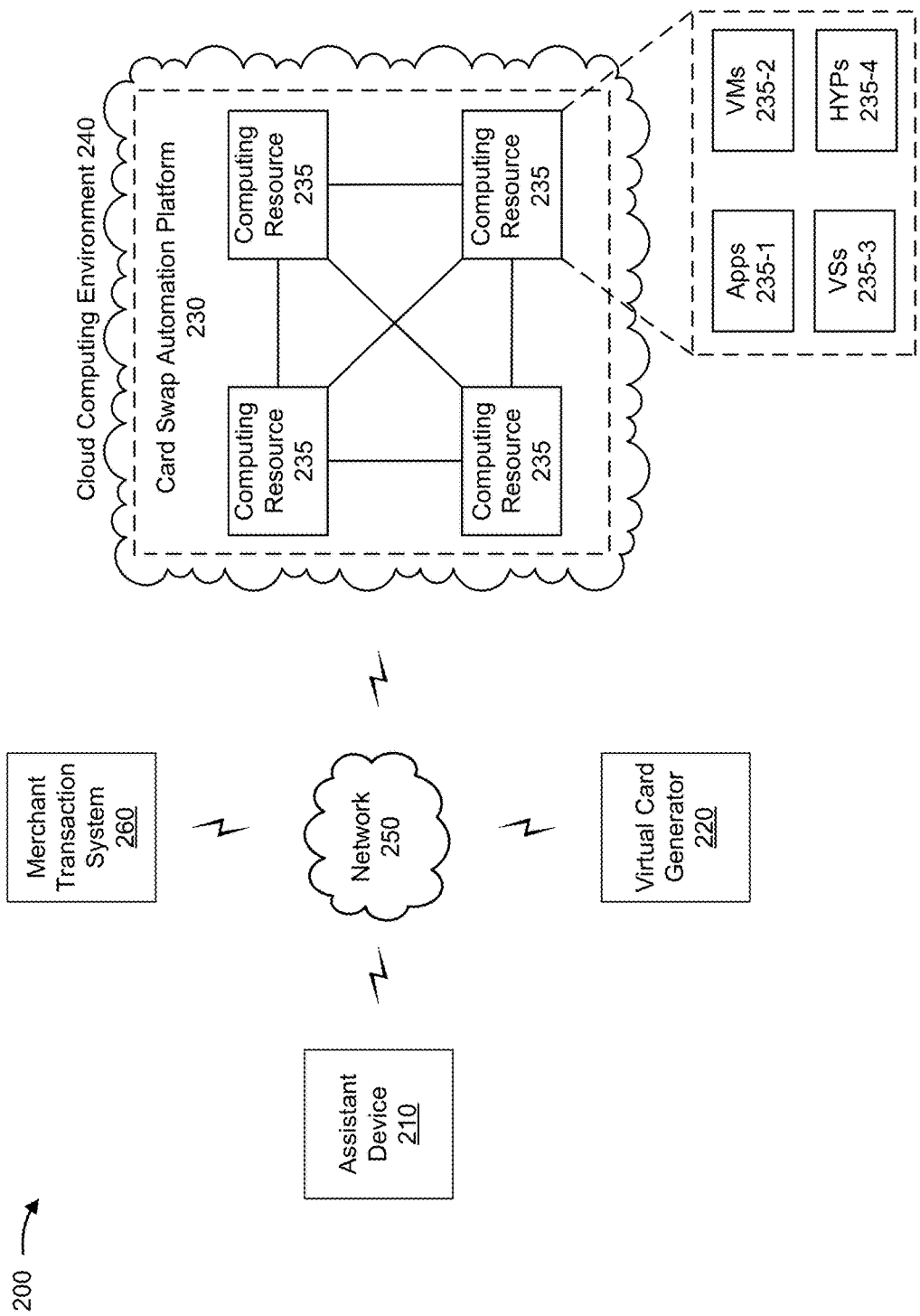
FIG. 2 is a diagram of an example environment in which systems and/or methods, described herein, may be implemented.

FIG. 2 is a diagram of an example environment 200 in which systems and/or methods described herein may be implemented. As shown in FIG. 2, environment 200 may include an assistant device 210, a virtual card generator 220, a card swap automation platform 230, a computing resource 235, a cloud computing environment 240, a network 250, and a merchant transaction system 260. Devices of environment 200 may interconnect via wired connections, wireless connections, or a combination of wired and wireless connections.

Assistant device 210 includes one or more devices capable of receiving, storing, processing, generating, and/or providing information associated with a set of voice commands. For example, assistant device 210 may be an always-on voice assistant that receives voice commands from a user and performs functions based on the voice commands. In some implementations, assistant device 210 may be a video assistant that processes gesture based commands, performs object recognition (e.g., recognizing a credit card and identifying user information based on a name, a credit card number, and/or the like imprinted on the credit card), and/or the like. In some implementations, assistant device 210 may be a user device, such as a cell phone or laptop computer with a virtual assistant functionality.

Virtual card generator 220 includes one or more devices capable of receiving, storing, processing, generating, and/or providing information associated with a virtual card. For example, virtual card generator 220 may be a server that generates virtual cards for a user account. In some implementations, virtual card generator 220 may be implemented in cloud computing environment 240. For example, virtual card generator 220 may be an application 235-1 implemented by a computing resource 235 of card swap automation platform 230. Additionally, or alternatively, virtual card generator 220 may be implemented in another cloud computing environment and/or outside of a cloud computing environment.

Card swap automation platform 230 includes one or more computing resources assigned to perform an automated card swap procedure. For example, card swap automation platform 230 may be a platform implemented by cloud computing environment 240 that may access merchant transaction system 260 using user credentials and may update transaction information in merchant transaction system 260 (e.g., swapping a credit card with a virtual card, swapping an old virtual card with a new virtual card, and/or the like). In some implementations, card swap automation platform 230 is implemented by computing resources 235 of cloud computing environment 240.

Card swap automation platform 230 may include a server device or a group of server devices. In some implementations, card swap automation platform 230 may be hosted in cloud computing environment 240. Notably, while implementations described herein describe card swap automation platform 230 as being hosted in cloud computing environment 240, in some implementations, card swap automation platform 230 may be non-cloud-based or may be partially cloud-based.

Cloud computing environment 240 includes an environment that delivers computing as a service, whereby shared resources, services, etc. may be provided to perform an automated card swap procedure. Cloud computing environment 240 may provide computation, software, data access, storage, and/or other services that do not require end-user knowledge of a physical location and configuration of a system and/or a device that delivers the services. As shown, cloud computing environment 240 may include card swap automation platform 230 and computing resource 235.

Computing resource 235 includes one or more personal computers, workstation computers, server devices, or another type of computation and/or communication device. In some implementations, computing resource 235 may host card swap automation platform 230. The cloud resources may include compute instances executing in computing resource 235, storage devices provided in computing resource 235, data transfer devices provided by computing resource 235, etc. In some implementations, computing resource 235 may communicate with other computing resources 235 via wired connections, wireless connections, or a combination of wired and wireless connections.

As further shown in FIG. 2, computing resource 235 may include a group of cloud resources, such as one or more applications ("APPs") 235-1, one or more virtual machines ("VMs") 235-2, virtualized storage ("VSs") 235-3, one or more hypervisors ("HYPs") 235-4, and/or the like.

Application 235-1 includes one or more software applications that may be provided to or accessed by assistant device 210. Application 235-1 may eliminate a need to install and execute the software applications on assistant device 210. For example, application 235-1 may include software associated with card swap automation platform 230 and/or any other software capable of being provided via cloud computing environment 240. In some implementations, one application 235-1 may send/receive information to/from one or more other applications 235-1, via virtual machine 235-2.

Virtual machine 235-2 includes a software implementation of a machine (e.g., a computer) that executes programs like a physical machine. Virtual machine 235-2 may be either a system virtual machine or a process virtual machine, depending upon use and degree of correspondence to any real machine by virtual machine 235-2. A system virtual machine may provide a complete system platform that supports execution of a complete operating system ("OS"). A process virtual machine may execute a single program and may support a single process. In some implementations, virtual machine 235-2 may execute on behalf of a user (e.g., assistant device 210), and may manage infrastructure of cloud computing environment 240, such as data management, synchronization, or long-duration data transfers.

Virtualized storage 235-3 includes one or more storage systems and/or one or more devices that use virtualization techniques within the storage systems or devices of computing resource 235. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 235-4 provides hardware virtualization techniques that allow multiple operating systems (e.g., "guest operating systems") to execute concurrently on a host computer, such as computing resource 235. Hypervisor 235-4 may present a virtual operating platform to the guest operating systems and may manage the execution of the guest operating systems. Multiple instances of a variety of operating systems may share virtualized hardware resources.

Network 250 includes one or more wired and/or wireless networks. For example, network 250 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

Merchant transaction system 260 includes one or more devices capable of storing, processing, and/or providing information associated with a transaction. For example, merchant transaction system 260 may be a web server providing a merchant webpage and enabling processing of transactions on the merchant webpage. In some implementations, merchant transaction system 260 may store a user profile. For example, merchant transaction system 260 may store information relating to a user, such as a user name, a user password, a user's address, a user's transaction information (e.g., a credit card, a virtual card, and/or the like), and/or the like.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
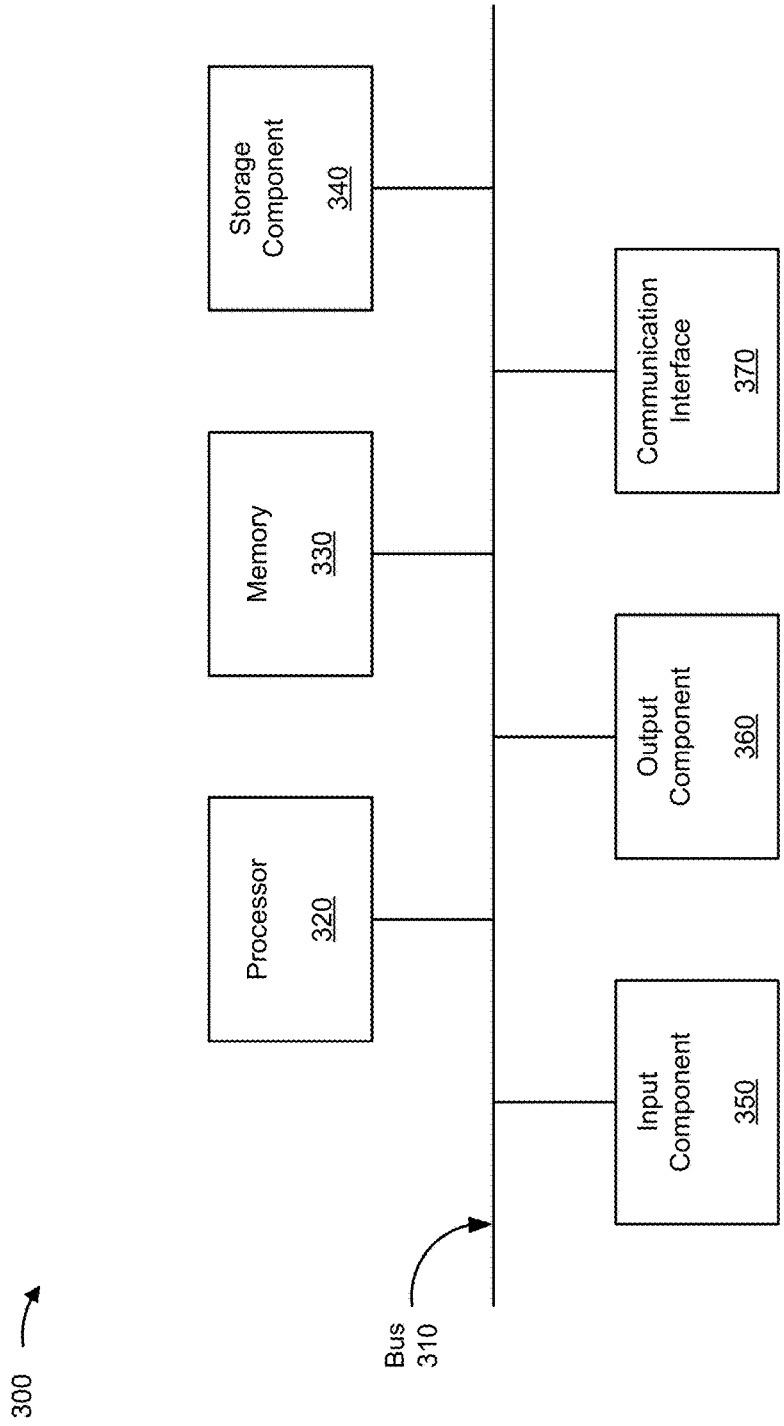
FIG. 3 is a diagram of example components of one or more devices of FIG. 2.

FIG. 3 is a diagram of example components of a device 300. Device 300 may correspond to assistant device 210, virtual card generator 220, card swap automation platform 230, computing resource 235, and/or merchant transaction system 260. In some implementations, assistant device 210, virtual card generator 220, card swap automation platform 230, computing resource 235, and/or merchant transaction system 260 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
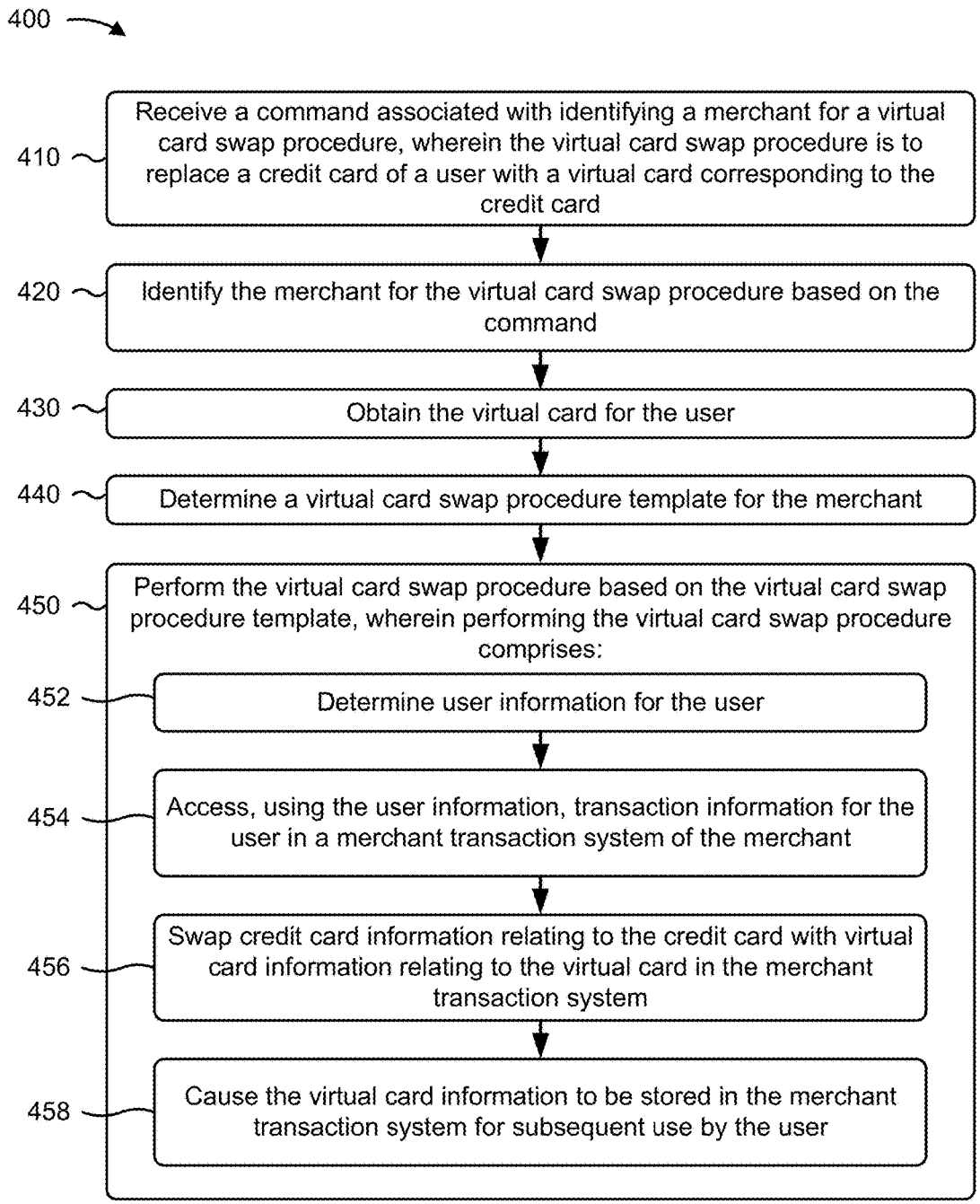
FIGS. 4-6 are flow charts of example processes for voice-assistant activated automated virtual card swapping.

FIG. 4 is a flow chart of an example process 400 for voice-assistant activated automated virtual card swapping. In some implementations, one or more process blocks of FIG. 4 may be performed by a card swap automation platform (e.g., card swap automation platform 230). In some implementations, one or more process blocks of FIG. 4 may be performed by another device or a group of devices separate from or including a card swap automation platform (e.g., card swap automation platform 230), such as an assistant device (e.g., assistant device 210), a virtual card generator (e.g., virtual card generator 220), a computing resource (e.g., computing resource 235), and a merchant transaction system (e.g., merchant transaction system 260).

As shown in FIG. 4, process 400 may include receiving a command associated with identifying a merchant for a virtual card swap procedure, wherein the virtual card swap procedure is to replace a credit card of a user with a virtual card corresponding to the credit card (block 410). For example, the card swap automation platform (e.g., using a processor 320, a memory 330, a storage component 340, an input component 350, a communication interface 370, and/or the like) may receive a command associated with identifying a merchant for a virtual card swap procedure, as described above. In some implementations, the virtual card swap procedure is to replace a credit card of a user with a virtual card corresponding to the credit card.

As further shown in FIG. 4, process 400 may include identifying the merchant for the virtual card swap procedure based on the command (block 420). For example, the card swap automation platform (e.g., using a processor 320, a memory 330, a storage component 340, an input component 350, a communication interface 370, and/or the like) may identify the merchant for the virtual card swap procedure based on the command, as described above.

As further shown in FIG. 4, process 400 may include obtaining the virtual card for the user (block 430). For example, the card swap automation platform (e.g., using a processor 320, a memory 330, a storage component 340, an input component 350, a communication interface 370, and/or the like) may obtain the virtual card for the user, as described above.

As further shown in FIG. 4, process 400 may include determining a virtual card swap procedure template for the merchant (block 440). For example, the card swap automation platform (e.g., using a processor 320, a memory 330, a storage component 340, an input component 350, a communication interface 370, and/or the like) may determine a virtual card swap procedure template for the merchant, as described above.

As further shown in FIG. 4, process 400 may include performing the virtual card swap procedure based on the virtual card swap procedure template (block 450). For example, the card swap automation platform (e.g., using a processor 320, a memory 330, a storage component 340, an output component 360, a communication interface 370, and/or the like) may perform the virtual card swap procedure based on the virtual card swap procedure template, as described above.

As further shown in FIG. 4, process 400 and block 450 may include determining user information for the user (block 452). For example, the card swap automation platform (e.g., using a processor 320, a memory 330, a storage component 340, an input component 350, a communication interface 370, and/or the like) may determine user information for the user, as described above.

As further shown in FIG. 4, process 400 and block 450 may include accessing, using the user information, transaction information for the user in a merchant transaction system of the merchant (block 454). For example, the card swap automation platform (e.g., using a processor 320, a memory 330, a storage component 340, an input component 350, a communication interface 370, and/or the like) may access, using the user information, transaction information for the user in a merchant transaction system of the merchant, as described above.

As further shown in FIG. 4, process 400 and block 450 may include swapping credit card information relating to the credit card with virtual card information relating to the virtual card in the merchant transaction system (block 456). For example, the card swap automation platform (e.g., using a processor 320, a memory 330, a storage component 340, an input component 350, a communication interface 370, and/or the like) may swap credit card information relating to the credit card with virtual card information relating to the virtual card in the merchant transaction system, as described above.

As further shown in FIG. 4, process 400 and block 450 may include causing the virtual card information to be stored in the merchant transaction system for subsequent use by the user (block 458). For example, the card swap automation platform (e.g., using a processor 320, a memory 330, a storage component 340, an output component 360, a communication interface 370, and/or the like) may cause the virtual card information to be stored in the merchant transaction system for subsequent use by the user, as described above.

Process 400 may include additional aspects, such as any single aspect or any combination of aspects described below and/or in connection with one or more other processes described elsewhere herein.

In a first implementation, performing the virtual card swap procedure includes using a first portion of the user information for the user to access the merchant transaction system; triggering a multi-factor authentication procedure based on using the first portion of the user information for the user; obtaining a second portion of the user information in connection with the multi-factor authentication procedure; and using the second portion of the user information for the user to access the merchant transaction system.

In a second implementation, alone or in combination with the first implementation, performing the virtual card swap procedure includes using a first portion of the user information for the user to access the merchant transaction system; triggering a knowledge-based authentication procedure based on using the first portion of the user information for the user; providing information relating to the knowledge-based authentication procedure to trigger a response; obtaining a second portion of the user information as the response to providing the information relating to the knowledge-based authentication procedure; and using the second portion of the user information for the user to access the merchant transaction system.

In a third implementation, alone or in combination with one or more of the first and second implementations, performing the virtual card swap procedure includes using a first portion of the user information for the user to access the merchant transaction system; triggering a knowledge-based authentication procedure based on using the first portion of the user information for the user; identifying a stored response to the knowledge-based authentication procedure; and using a second portion of the user information for the user based on the stored response to the knowledge-based authentication procedure.

In a fourth implementation, alone or in combination with one or more of the first through third implementations, process 400 includes identifying a plurality of merchants, where the plurality of merchants includes the merchant; and performing a plurality of virtual card swap procedures as a batch process, where the plurality of virtual card swap procedures includes the virtual card swap procedure.

In a fifth implementation, alone or in combination with one or more of the first through fourth implementations, process 400 includes authenticating the user via a voice assistant; processing the command based on authenticating the user via the voice assistant; and identifying the merchant for the virtual card swap procedure based on processing the command.

In a sixth implementation, alone or in combination with one or more of the first through fifth implementations, process 400 includes determining, based on the virtual card swap procedure template for the merchant, what user information is needed to access the merchant transaction system; and communicating with a voice assistant to obtain the user information based on determining what user information is needed.

In a seventh implementation, alone or in combination with one or more of the first through sixth implementations, the command is at least one of: a voice command, a gesture command, or a configured symbolic command.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
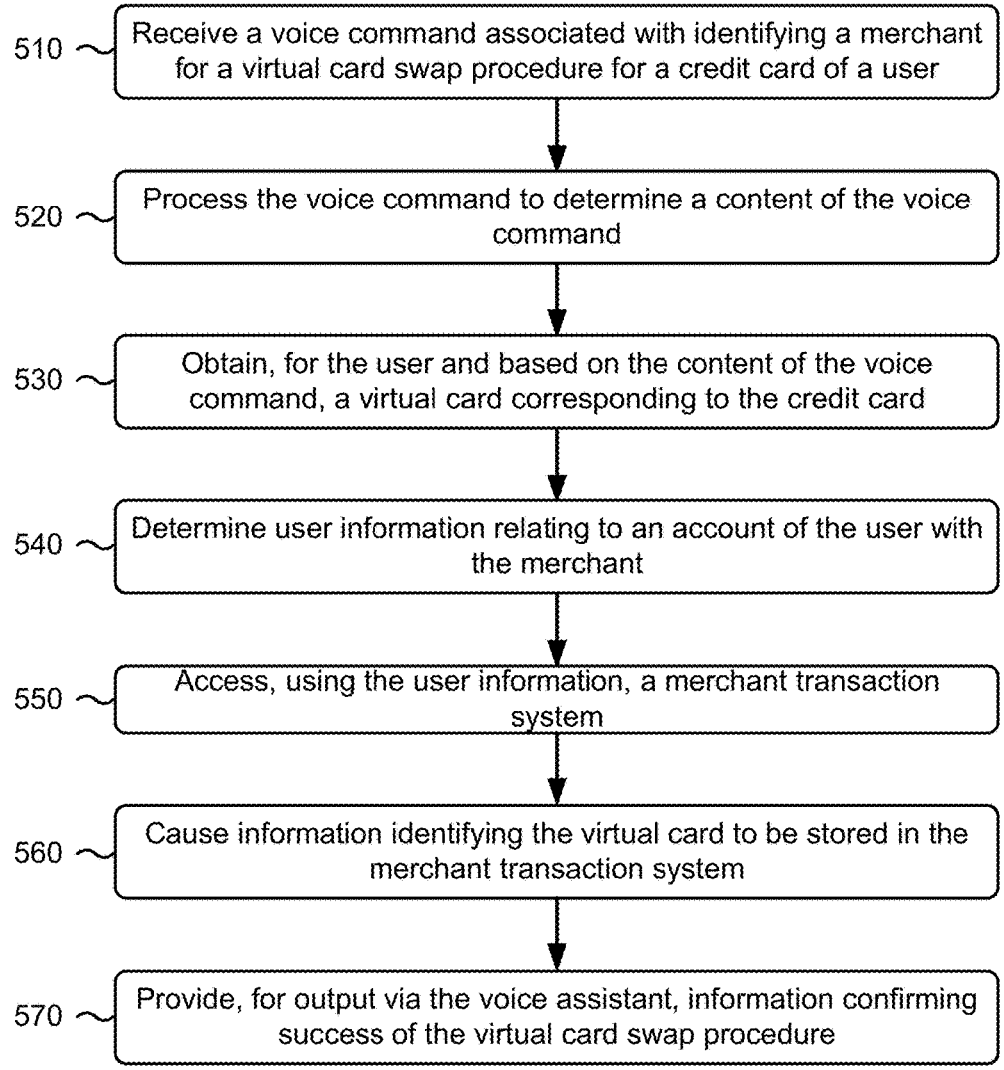

FIG. 5 is a flow chart of an example process 500 for voice-assistant activated automated virtual card swapping. In some implementations, one or more process blocks of FIG. 5 may be performed by a card swap automation platform (e.g., card swap automation platform 230). In some implementations, one or more process blocks of FIG. 5 may be performed by another device or a group of devices separate from or including a card swap automation platform (e.g., card swap automation platform 230), such as an assistant device (e.g., assistant device 210), a virtual card generator (e.g., virtual card generator 220), a computing resource (e.g., computing resource 235), and a merchant transaction system (e.g., merchant transaction system 260).

As shown in FIG. 5, process 500 may include receiving a voice command associated with identifying a merchant for a virtual card swap procedure for a credit card of a user (block 510). For example, the card swap automation platform (e.g., using a processor 320, a memory 330, a storage component 340, an input component 350, a communication interface 370, and/or the like) may receive a voice command associated with identifying a merchant for a virtual card swap procedure for a credit card of a user, as described above.

As further shown in FIG. 5, process 500 may include processing the voice command to determine a content of the voice command (block 520). For example, the card swap automation platform (e.g., using a processor 320, a memory 330, a storage component 340, an input component 350, a communication interface 370, and/or the like) may process the voice command to determine a content of the voice command, as described above.

As further shown in FIG. 5, process 500 may include obtaining, for the user and based on the content of the voice command, a virtual card corresponding to the credit card (block 530). For example, the card swap automation platform (e.g., using a processor 320, a memory 330, a storage component 340, an input component 350, a communication interface 370, and/or the like) may obtain, for the user and based on the content of the voice command, a virtual card corresponding to the credit card, as described above.

As further shown in FIG. 5, process 500 may include determining user information relating to an account of the user with the merchant (block 540). For example, the card swap automation platform (e.g., using a processor 320, a memory 330, a storage component 340, an input component 350, a communication interface 370, and/or the like) may determine user information relating to an account of the user with the merchant, as described above.

As further shown in FIG. 5, process 500 may include accessing, using the user information, a merchant transaction system (block 550). For example, the card swap automation platform (e.g., using a processor 320, a memory 330, a storage component 340, an input component 350, a communication interface 370, and/or the like) may access, using the user information, a merchant transaction system, as described above.

As further shown in FIG. 5, process 500 may include causing information identifying the virtual card to be stored in the merchant transaction system (block 560). For example, the card swap automation platform (e.g., using a processor 320, a memory 330, a storage component 340, an input component 350, a communication interface 370, and/or the like) may cause information identifying the virtual card to be stored in the merchant transaction system, as described above.

As further shown in FIG. 5, process 500 may include providing, for output via the voice assistant, information confirming success of the virtual card swap procedure (block 570). For example, the card swap automation platform (e.g., using a processor 320, a memory 330, a storage component 340, an output component 360, a communication interface 370, and/or the like) may provide, for output via the voice assistant, information confirming success of the virtual card swap procedure, as described above.

Process 500 may include additional aspects, such as any single aspect or any combination of aspects described below and/or in connection with one or more other processes described elsewhere herein.

In a first implementation, process 500 includes determining a virtual card swap procedure template for the merchant based on stored information in a data structure, and accessing the merchant transaction system using the virtual card swap procedure template.

In a second implementation, alone or in combination with the first implementation, process 500 includes parsing information of the merchant transaction system to generate a virtual card swap procedure template, and accessing the merchant transaction system using the virtual card swap procedure template.

In a third implementation, alone or in combination with one or more of the first and second implementations, process 500 includes configuring one or more transaction restrictions for the virtual card.

In a fourth implementation, alone or in combination with one or more of the first through third implementations, the virtual card is configured to be usable for the merchant transaction system and not for other transaction systems.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
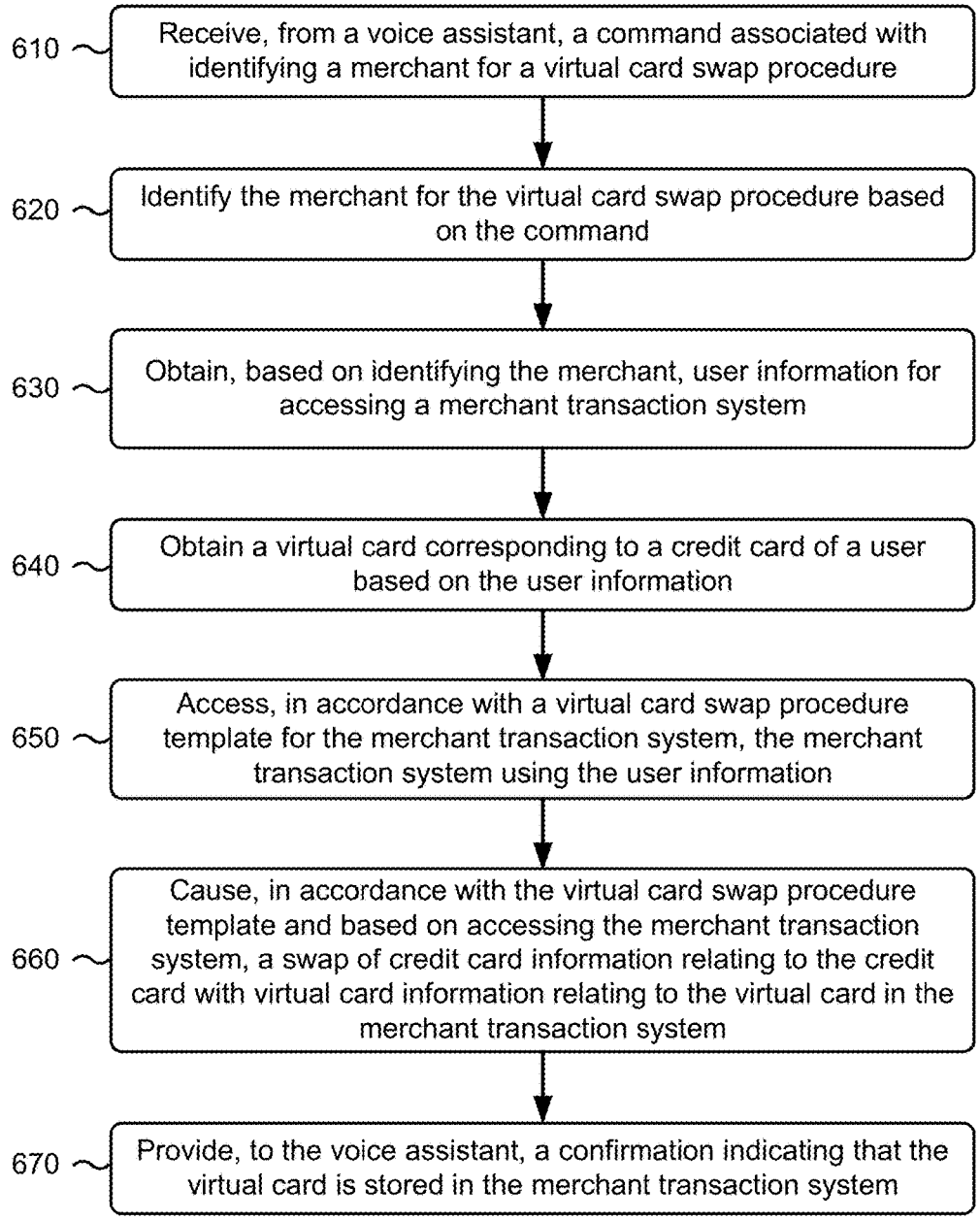

FIG. 6 is a flow chart of an example process 600 for voice-assistant activated automated virtual card swapping. In some implementations, one or more process blocks of FIG. 6 may be performed by a card swap automation platform (e.g., card swap automation platform 230). In some implementations, one or more process blocks of FIG. 6 may be performed by another device or a group of devices separate from or including a card swap automation platform (e.g., card swap automation platform 230), such as an assistant device (e.g., assistant device 210), a virtual card generator (e.g., virtual card generator 220), a computing resource (e.g., computing resource 235), and a merchant transaction system (e.g., merchant transaction system 260).

As shown in FIG. 6, process 600 may include receiving, from a voice assistant, a command associated with identifying a merchant for a virtual card swap procedure (block 610). For example, the card swap automation platform (e.g., using a processor 320, a memory 330, a storage component 340, an input component 350, a communication interface 370, and/or the like) may receive, from a voice assistant, a command associated with identifying a merchant for a virtual card swap procedure, as described above.

As further shown in FIG. 6, process 600 may include identifying the merchant for the virtual card swap procedure based on the command (block 620). For example, the card swap automation platform (e.g., using a processor 320, a memory 330, a storage component 340, an input component 350, a communication interface 370, and/or the like) may identify the merchant for the virtual card swap procedure based on the command, as described above.

As further shown in FIG. 6, process 600 may include obtaining, based on identifying the merchant, user information for accessing a merchant transaction system (block 630). For example, the card swap automation platform (e.g., using a processor 320, a memory 330, a storage component 340, an input component 350, a communication interface 370, and/or the like) may obtain, based on identifying the merchant, user information for accessing a merchant transaction system, as described above.

As further shown in FIG. 6, process 600 may include obtaining, based on the user information, a virtual card corresponding to a credit card of a user (block 640). For example, the card swap automation platform (e.g., using a processor 320, a memory 330, a storage component 340, an input component 350, a communication interface 370, and/or the like) may obtain, based on the user information, a virtual card corresponding to a credit card of a user based on the user information, as described above.

As further shown in FIG. 6, process 600 may include accessing, using the user information and in accordance with a virtual card swap procedure template for the merchant transaction system, the merchant transaction system (block 650). For example, the card swap automation platform (e.g., using a processor 320, a memory 330, a storage component 340, an input component 350, a communication interface 370, and/or the like) may access, using the user information and in accordance with a virtual card swap procedure template for the merchant transaction system, the merchant transaction system, as described above.

As further shown in FIG. 6, process 600 may include causing, in the merchant transaction system and based on accessing the merchant transaction system, and in accordance with the virtual card swap procedure template, a swap of credit card information relating to the credit card with virtual card information relating to the virtual card (block 660). For example, the card swap automation platform (e.g., using a processor 320, a memory 330, a storage component 340, an input component 350, a communication interface 370, and/or the like) may cause, in the merchant transaction system and based on accessing the merchant transaction system, and in accordance with the virtual card swap procedure template, a swap of credit card information relating to the credit card with virtual card information relating to the virtual card, as described above.

As further shown in FIG. 6, process 600 may include providing, to the voice assistant, a confirmation indicating that the virtual card is stored in the merchant transaction system (block 670). For example, the card swap automation platform (e.g., using a processor 320, a memory 330, a storage component 340, an output component 360, a communication interface 370, and/or the like) may provide, to the voice assistant, a confirmation indicating that the virtual card is stored in the merchant transaction system, as described above.

Process 600 may include additional aspects, such as any single aspect or any combination of aspects described below and/or in connection with one or more other processes described elsewhere herein.

In a first implementation, process 600 includes completing a transaction using the virtual card in the merchant transaction system.

In a second implementation, alone or in combination with the first implementation, the virtual card is a merchant-specific virtual card.

In a third implementation, alone or in combination with one or more of the first and second implementations, process 600 includes communicating with the voice assistant to cause the voice assistant to obtain the user information, and receiving the user information from the voice assistant.

In a fourth implementation, alone or in combination with one or more of the first through third implementations, process 600 includes authenticating the user via the voice assistant.

In a fifth implementation, alone or in combination with one or more of the first through fourth implementations, process 600 includes parsing an interface of the merchant transaction system; and generating the virtual card swap procedure template for accessing the merchant transaction system based on parsing the interface of the merchant transaction system.

In a sixth implementation, alone or in combination with one or more of the first through fifth implementations, process 600 includes storing, based on generating the virtual card swap procedure template for subsequent use with a subsequent user.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, based on context, refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method, comprising:
    receiving, by a device, a command associated with identifying a merchant for a virtual card swap procedure,
        wherein the virtual card swap procedure is to replace a credit card of a user with a virtual card corresponding to the credit card;
    identifying, by the device, the merchant for the virtual card swap procedure based on the command;
    obtaining, by the device, the virtual card for the user;
    determining, by the device, a virtual card swap procedure template for the merchant; and
    performing, by the device, the virtual card swap procedure based on the virtual card swap procedure template,
        wherein performing the virtual card swap procedure comprises:
            determining, by the device, user information for the user;
            accessing, by the device and using the user information, transaction information for the user in a merchant transaction system of the merchant;
            swapping, by the device, credit card information relating to the credit card with virtual card information relating to the virtual card in the merchant transaction system; and
            causing, by the device, the virtual card information to be stored in the merchant transaction system for subsequent use by the user.

2. The method of claim 1, wherein performing the virtual card swap procedure comprises:
    using a first portion of the user information for the user to access the merchant transaction system;
    triggering a multi-factor authentication procedure based on using the first portion of the user information for the user;
    obtaining a second portion of the user information in connection with the multi-factor authentication procedure; and using the second portion of the user information for the user to access the merchant transaction system.

3. The method of claim 1, wherein performing the virtual card swap procedure comprises:
using a first portion of the user information for the user to access the merchant transaction system;
triggering a knowledge-based authentication procedure based on using the first portion of the user information for the user;
providing information relating to the knowledge-based authentication procedure to trigger a response;
obtaining a second portion of the user information as the response to providing the information relating to the knowledge-based authentication procedure; and
using the second portion of the user information for the user to access the merchant transaction system.

4. The method of claim 1, wherein performing the virtual card swap procedure comprises:
using a first portion of the user information for the user to access the merchant transaction system;
triggering a knowledge-based authentication procedure based on using the first portion of the user information for the user;
identifying a stored response to the knowledge-based authentication procedure; and
using a second portion of the user information for the user based on the stored response to the knowledge-based authentication procedure.

5. The method of claim 1, further comprising:
identifying a plurality of merchants,
    wherein the plurality of merchants includes the merchant; and
performing a plurality of virtual card swap procedures as a batch process,
    wherein the plurality of virtual card swap procedures includes the virtual card swap procedure.

6. The method of claim 1, further comprising:
authenticating the user via a voice assistant;
processing the command based on authenticating the user via the voice assistant; and
wherein identifying the merchant for the virtual card swap procedure comprises:
    identifying the merchant for the virtual card swap procedure based on processing the command.

7. The method of claim 1, further comprising:
determining, based on the virtual card swap procedure template for the merchant, what user information is needed to access the merchant transaction system; and
communicating with a voice assistant to obtain the user information based on determining what user information is needed.

8. The method of claim 1, wherein the command is at least one of:
a voice command,
a gesture command, or
a configured symbolic command.

9. A device, comprising:
one or more memories; and
one or more processors, communicatively coupled to the one or more memories, configured to:
    receive, from a voice assistant, a voice command associated with identifying a merchant for a virtual card swap procedure for a credit card of a user;
    process the voice command to determine a content of the voice command;
    obtain, for the user and based on the content of the voice command, a virtual card corresponding to the credit card;
    determine user information relating to an account of the user with the merchant;
    access, using the user information, a merchant transaction system;
    cause information identifying the virtual card to be stored in the merchant transaction system; and
    provide, for output via the voice assistant, information confirming success of the virtual card swap procedure.

10. The device of claim 9, wherein the one or more processors are further configured to:
determine a virtual card swap procedure template for the merchant based on stored information in a data structure; and
wherein the one or more processors, when accessing the merchant transaction system, are to:
    access the merchant transaction system using the virtual card swap procedure template.

11. The device of claim 9, wherein the one or more processors are further configured to:
parse information of the merchant transaction system to generate a virtual card swap procedure template; and
wherein the one or more processors, when accessing the merchant transaction system, are to:
    access the merchant transaction system using the virtual card swap procedure template.

12. The device of claim 9, wherein one or more transaction restrictions are configured for the virtual card.

13. The device of claim 9, wherein the virtual card is configured to be usable for the merchant transaction system and not for other transaction systems.

14. A non-transitory computer-readable medium storing instructions, the instructions comprising:
one or more instructions that, when executed by one or more processors of a device, cause the one or more processors to:
    receive, from a voice assistant, a command associated with identifying a merchant for a virtual card swap procedure;
    identify the merchant for the virtual card swap procedure based on the command;
    obtain, based on identifying the merchant, user information for accessing a merchant transaction system;
    obtain a virtual card corresponding to a credit card of a user based on the user information;
    accessing, in accordance with a virtual card swap procedure template for the merchant transaction system, the merchant transaction system using the user information;
    causing, in accordance with the virtual card swap procedure template and based on accessing the merchant transaction system, a swap of credit card information relating to the credit card with virtual card information relating to the virtual card in the merchant transaction system; and
    provide, to the voice assistant, a confirmation indicating that the virtual card is stored in the merchant transaction system.

15. The non-transitory computer-readable medium of claim 14, wherein the instructions further comprise:
one or more instructions that, when executed by the one or more processors, cause the one or more processors to:

complete a transaction using the virtual card in the merchant transaction system.

16. The non-transitory computer-readable medium of claim 14, wherein the virtual card is a merchant-specific virtual card.

17. The non-transitory computer-readable medium of claim 14, wherein the instructions further comprise:
one or more instructions that, when executed by the one or more processors, cause the one or more processors to:
communicate with the voice assistant to cause the voice assistant to obtain the user information; and
receive the user information from the voice assistant.

18. The non-transitory computer-readable medium of claim 14, wherein the instructions further comprise:
one or more instructions that, when executed by the one or more processors, cause the one or more processors to:
authenticate the user via the voice assistant.

19. The non-transitory computer-readable medium of claim 14, wherein the instructions further comprise:
one or more instructions that, when executed by the one or more processors, cause the one or more processors to:
parse an interface of the merchant transaction system; and
generate the virtual card swap procedure template for accessing the merchant transaction system based on parsing the interface of the merchant transaction system.

20. The non-transitory computer-readable medium of claim 14, wherein the instructions further comprise:
one or more instructions that, when executed by the one or more processors, cause the one or more processors to:
store, based on generating the virtual card swap procedure template for subsequent use with a subsequent user.

* * * * *